United States Patent
Wu

(10) Patent No.: US 11,910,227 B2
(45) Date of Patent: Feb. 20, 2024

(54) DATA TRANSMISSION METHOD AND TERMINAL DEVICE

(71) Applicant: VIVO MOBILE COMMUNICATION CO., LTD., Guangdong (CN)

(72) Inventor: Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 407 days.

(21) Appl. No.: 17/205,996

(22) Filed: Mar. 18, 2021

(65) Prior Publication Data

US 2021/0258819 A1 Aug. 19, 2021

Related U.S. Application Data

(63) Continuation of application No. PCT/CN2019/105602, filed on Sep. 12, 2019.

(30) Foreign Application Priority Data

Sep. 21, 2018 (CN) .......................... 201811109861.8

(51) Int. Cl.
*H04W 28/00* (2009.01)
*H04W 28/02* (2009.01)
(Continued)

(52) U.S. Cl.
CPC ......... *H04W 28/0268* (2013.01); *H04W 4/80* (2018.02); *H04W 28/0263* (2013.01);
(Continued)

(58) Field of Classification Search
CPC ............... H04W 28/0268; H04W 4/80; H04W 28/0263; H04W 28/06; H04W 80/02;
(Continued)

(56) References Cited

U.S. PATENT DOCUMENTS

2015/0341830 A1  11/2015  Jeong
2016/0286340 A1  9/2016  Zhu
(Continued)

FOREIGN PATENT DOCUMENTS

CN    107005884 A    8/2017
CN    107950048 A    4/2018
(Continued)

OTHER PUBLICATIONS

EP Search Report in Application No. 19862469.4 dated Jun. 23, 2021.
(Continued)

*Primary Examiner* — Lakeram Jangbahadur
(74) *Attorney, Agent, or Firm* — Maschoff Brennan

(57) ABSTRACT

The present disclosure provides a data transmission method and a terminal device. The data transmission method includes: obtaining interface information of an external device communication protocol and a 3GPP network protocol; and receiving or sending, by a first protocol entity of an external device communication protocol stack, data according to the interface information through a second protocol entity of an air interface protocol stack of a 3GPP network.

6 Claims, 6 Drawing Sheets

(51) Int. Cl.
*H04W 4/80* (2018.01)
*H04W 28/06* (2009.01)
*H04W 80/02* (2009.01)
*H04W 84/12* (2009.01)
*H04W 92/10* (2009.01)

(52) U.S. Cl.
CPC ........... *H04W 28/06* (2013.01); *H04W 80/02* (2013.01); *H04W 84/12* (2013.01); *H04W 92/10* (2013.01)

(58) Field of Classification Search
CPC ..... H04W 84/12; H04W 92/10; H04W 88/06; H04L 69/08; H04L 69/18; H04L 69/321; H04L 67/146; H04L 69/04; H04L 69/30; H04L 69/323
See application file for complete search history.

(56) References Cited

U.S. PATENT DOCUMENTS

| | | | |
|---|---|---|---|
| 2017/0034688 A1 | 2/2017 | Kim et al. | |
| 2017/0215122 A1* | 7/2017 | Nigam | H04L 45/74 |
| 2017/0318493 A1* | 11/2017 | Laselva | H04W 28/0273 |
| 2018/0205764 A1* | 7/2018 | Jeon | H04L 67/61 |

FOREIGN PATENT DOCUMENTS

| | | | | |
|---|---|---|---|---|
| JP | 2006198241 A | * | 8/2006 | ............ G16H 40/20 |
| JP | 2006198241 A | | 8/2006 | |
| KR | 20150135035 A | | 12/2015 | |
| WO | 2018084646 A1 | | 5/2018 | |

OTHER PUBLICATIONS

"User plane aspects of LTE-WLAN aggregation" Ericsson, 3GPP TSG-RAN WG2 #91bis, Tdoc R2-154766, Oct. 5, 2019.
"Report of email discussion [96#57][LTE/FeD2D]—Adapter layer and bearer handling" Huaweri, 3GPP TSG-RAN WG2 Meeting #97, R2-1701133, Feb. 13, 2017.
"Protocol architecture for I-IOT" vivo, 3GPP TSG-RAN WG2 Meeting #104, R2-1816939, Nov. 12, 2018.
Written Opinion and International Search Report in Application No. PCT/CN2019/105602 dated Apr. 1, 2021.
KR Office Action in Application No. 2021-7011822 dated Apr. 28, 2022.
SG Office Action in Application No. 11202102835P dated Nov. 2, 2022.

* cited by examiner

DATA TRANSMISSION METHOD AND TERMINAL DEVICE

CROSS-REFERENCE TO RELATED APPLICATIONS

This application is a continuation application of International Application No. PCT/CN2019/105602 filed on Sep. 12, 2019, which claims priority to Chinese Patent Application No. 201811109861.8 filed on Sep. 21, 2018 in China, which is incorporated herein by reference in its entirety.

TECHNICAL FIELD

The present disclosure relates to the field of communications technologies, and in particular, to a data transmission method and a terminal device.

BACKGROUND

In a protocol stack in the related art, data is transmitted through interaction between adjacent protocol layers. For example, when an Internet protocol (IP) layer entity and a medium access control (MAC) layer entity interact, a data packet sent by the IP layer entity to the MAC layer entity is specifically a data packet generated by the IP layer entity, and is referred to as an IP protocol data unit (PDU). A data packet received by the MAC layer entity from a higher layer is a MAC service data unit (SDU).

A third generation partnership project (3GPP) network protocol may include at least a 4G long term evolution (LTE) network protocol and a 5G new radio (NR) network protocol. A 4G LTE protocol stack of a terminal device, for example, user equipment (UE) may include: a packet data convergence protocol (PDCP) layer, a radio link control (RLC) layer, a MAC layer, and a physical (PHY) layer. A 5G NR protocol stack of the UE may include: a service data adaptation protocol (SDAP) layer, a PDCP layer, an RLC layer, a MAC layer, and a PHY layer.

When the UE communicates with an external device through wireless fidelity (WiFi), bluetooth, a wired local area network (for example, IEEE 802.3), or the like, a network node of WiFi, bluetooth, a wired local area network, or the like may need to communicate with another network node by using a 3GPP network of the UE based on a service requirement. However, for the requirement of communication through a 3GPP network, no relevant method in the related art specifies how to transmit data to ensure smooth execution of a related communication service.

SUMMARY

According to a first aspect, an embodiment of the present disclosure provides a data transmission method, including:
obtaining interface information of an external device communication protocol and a 3GPP network protocol; and
receiving or sending, by a first protocol entity of an external device communication protocol stack, data according to the interface information through a second protocol entity of a protocol stack of a 3GPP network.

According to a second aspect, an embodiment of the present disclosure provides a terminal device, including:
an obtaining module, configured to obtain interface information of an external device communication protocol and a 3GPP network protocol; and
a second protocol entity, where the second protocol entity is a protocol entity corresponding to a protocol stack of a 3GPP network of the terminal device; and
a first protocol entity, where the first protocol entity is a protocol entity corresponding to a communication protocol stack of an external device of the terminal device, and is configured to receive or send data according to interface information by using the second protocol entity.

According to a third aspect, an embodiment of the present disclosure further provides a terminal device, including a memory, a processor, and a computer program stored in the memory and capable of running on the processor, where when the computer program is executed by the processor, the steps of the foregoing data transmission method are implemented.

According to a fourth aspect, an embodiment of the present disclosure further provides a computer-readable storage medium, where the computer-readable storage medium stores a computer program, and when the computer program is executed by a processor, the steps of the foregoing data transmission method may be implemented.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other accompanying drawings from these accompanying drawings without creative efforts.

DETAILED DESCRIPTION OF EMBODIMENTS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other accompanying drawings from these accompanying drawings without creative efforts.

Figure 2:
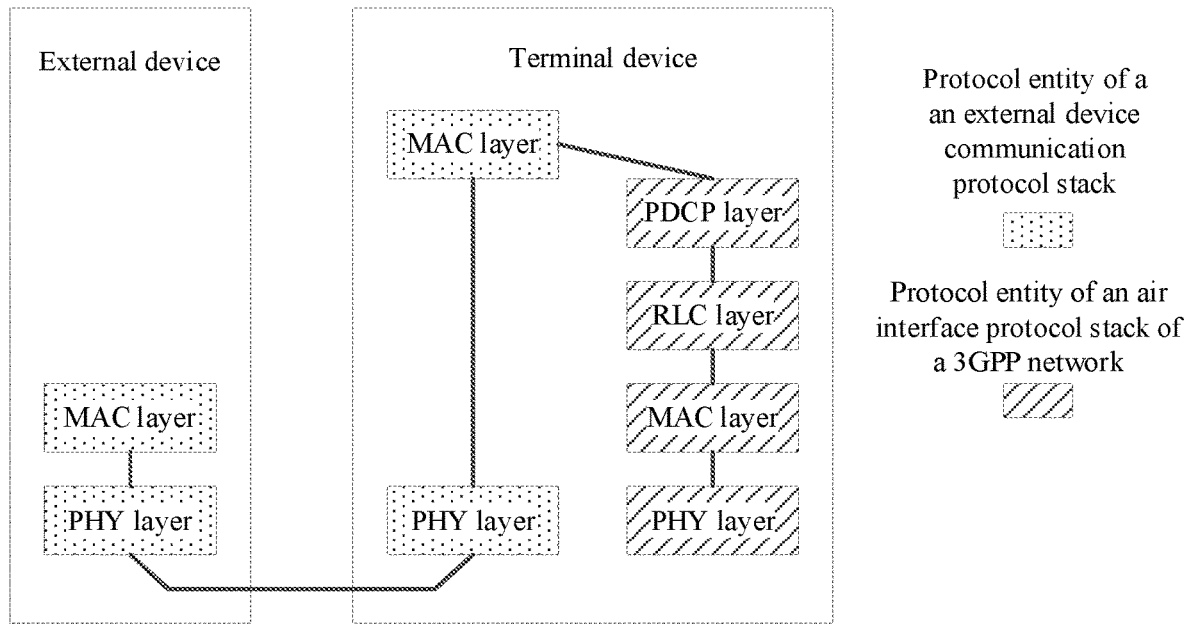
FIG. 2 is a schematic diagram 1 of a protocol stack of a terminal device according to a specific embodiment of the present disclosure.

It is first noted that in the embodiments of the present disclosure, a terminal device and an external device are connected physically. As shown in FIG. 2, data may be transmitted between a PHY layer of the terminal device and a PHY layer of the external device. From the perspective of implementation, the external device can be connected to the terminal device, or may not be connected to the terminal device, or may be integrated on the terminal device. This is not limited in the embodiments of the present disclosure.

The terminal device and the external device may communicate based on a communication protocol of the external device, and a protocol entity for the communication between the terminal device and the external device is a protocol entity corresponding to an external device communication protocol stack. The external device communication protocol may include any one of the following:
- a WiFi communication protocol, for example, IEEE 802.11;
- a bluetooth protocol; or
- a wired local area network communication protocol, for example, IEEE 802.3.

The following describes the present disclosure in detail with reference to the embodiments and accompanying drawings.

Figure 1:
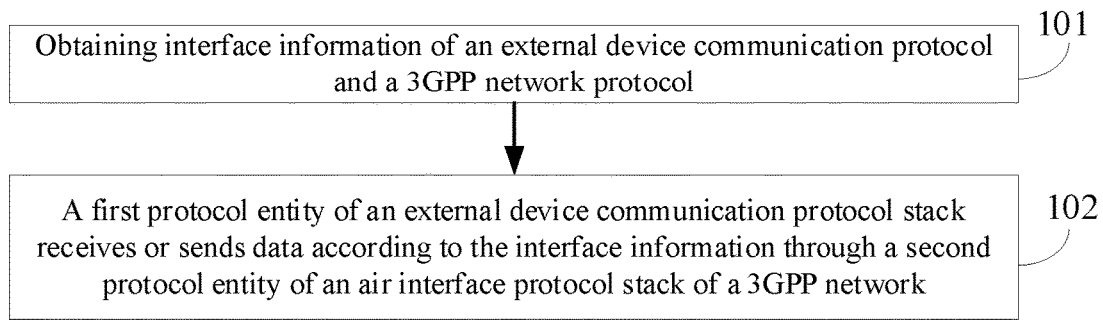
FIG. 1 is a flowchart of a data transmission method according to an embodiment of the present disclosure.

As shown in FIG. 1, an embodiment of the present disclosure provides a data transmission method, applied to a terminal device. The method includes the following steps:

Step 101: Obtain interface information of an external device communication protocol and a 3GPP network protocol.

The interface information may be configured by a network side, or specified in a protocol. The 3GPP network protocol may be understood as a 4G network protocol, a 5G network protocol, a 6G network protocol, or the like.

Step 102: A first protocol entity of an external device communication protocol stack receives or sends data according to the interface information through a second protocol entity of an air interface protocol stack of a 3GPP network.

It may be understood that the air interface protocol stack of the 3GPP network may be a 4G LTE protocol stack, a 5G NR protocol stack, or the like.

In the embodiments of the present disclosure, the first protocol entity of the external device communication protocol stack of the terminal device receives or sends the data according to the obtained interface information of the external device communication protocol and the 3GPP network protocol by using the second protocol entity of the air interface protocol stack of the 3GPP network, and interaction between the external device communication protocol stack and the air interface protocol stack of the 3GPP network may be implemented. Therefore, when a network node of WiFi, bluetooth, a wired local area network, or the like communicates with another network node by using a 3GPP network of a terminal device, the data transmission requirement may be satisfied, and smooth execution of a related communication service is ensured.

In a specific embodiment of the present disclosure, in the protocol stack as shown in FIG. 2, the interface information may optionally include at least one of the following:
- a MAC PDU of the external device communication protocol is used as a PDCP SDU of a first network protocol to receive or send the data;
- a data radio bearer (DRB) identifier of a first network protocol corresponding to data (for example, entire data) or a data flow (for example, a part of data) of the external device communication protocol;
- an evolved packet system (EPS) bearer identifier of a first network protocol corresponding to data (for example, entire data) or a data flow (for example, a part of data) of the external device communication protocol; or
- a PDCP entity identifier of a first network protocol corresponding to data (for example, entire data) or a data flow (for example, a part of data) of the external device communication protocol.

The first network protocol may be understood as a 4G LTE protocol, and the first network protocol stack may be understood as a 4G LTE protocol stack. As shown in FIG. 2, the first network protocol stack may include a PDCP layer, an RLC layer, a MAC layer, and a PHY layer, and the external device communication protocol stack may include a MAC layer and a PHY layer. The MAC layer entity of the external device communication protocol stack may interact with the PDCP layer entity of the first network protocol stack, that is, receive or send data by using the PDCP layer entity of the first network protocol stack.

Further, as shown in FIG. 2, step 102 may include:
- sending, by a MAC layer entity of the external device communication protocol stack, a MAC PDU to a PDCP layer entity of a first network protocol stack as a PDCP SDU of the PDCP layer entity of the first network protocol stack; and/or
- receiving, by a MAC layer entity of the external device communication protocol stack, a PDCP SDU sent by a PDCP layer entity of a first network protocol stack as a MAC PDU of the MAC layer entity of the external device communication protocol stack.

In this way, the MAC PDU of the external device may be sent by using the first network protocol stack.

For example, as shown in FIG. 2, if the first network protocol stack is an LTE protocol stack, the process of sending data by using the LTE protocol stack may be:

S1: A PHY layer entity of the external device communication protocol stack sends a PHY SDU to a MAC layer entity of the external device communication protocol stack as a MAC PDU of the MAC layer entity of the external device communication protocol stack.

S2: A MAC layer entity of the external device communication protocol stack sends a MAC PDU to a PDCP layer entity of an LTE protocol stack as a PDCP SDU of the PDCP layer entity of the LTE protocol stack.

The process of receiving data by using the LTE protocol stack may be:

S1: A MAC layer entity of the external device communication protocol stack receives a PDCP SDU sent by a PDCP layer entity of an LTE protocol stack as a MAC PDU of the MAC layer entity of the external device communication protocol stack.

S2: A MAC layer entity of the external device communication protocol stack sends a MAC PDU to a PHY layer entity of the external device communication protocol stack as a PHY SDU of the PHY layer entity of the external device communication protocol stack.

Figure 3:
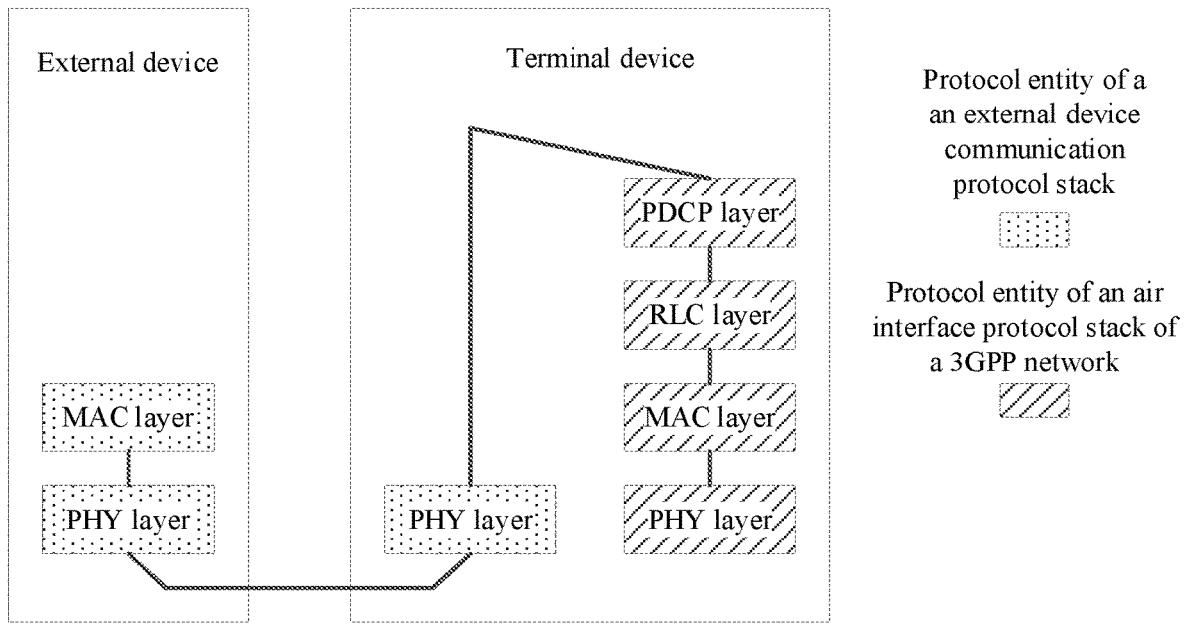
FIG. 3 is a schematic diagram 2 of a protocol stack of a terminal device according to a specific embodiment of the present disclosure.

In a specific embodiment of the present disclosure, in the protocol stack as shown in FIG. 3, the interface information may optionally include at least one of the following:
- a PHY SDU or a MAC PDU of the external device communication protocol is used as a PDCP SDU of a first network protocol to receive or send the data;
- a DRB identifier of a first network protocol corresponding to data (for example, entire data) or a data flow (for example, a part of data) of the external device communication protocol;
- an EPS bearer identifier of a first network protocol corresponding to data (for example, entire data) or a data flow (for example, a part of data) of the external device communication protocol; or
- a PDCP entity identifier of a first network protocol corresponding to data (for example, entire data) or a data flow (for example, a part of data) of the external device communication protocol.

The first network protocol may be understood as a 4G LTE protocol, and the first network protocol stack may be understood as a 4G LTE protocol stack. As shown in FIG. 3, the first network protocol stack may include a PDCP layer, an RLC layer, a MAC layer, and a PHY layer, and the external device communication protocol stack may include a MAC layer and a PHY layer. The PHY layer entity of the external device communication protocol stack may interact with the PDCP layer entity of the first network protocol stack, that is, receive or send data by using the PDCP layer entity of the first network protocol stack.

Further, as shown in FIG. 3, step 102 may include:
- sending, by a PHY layer entity of the external device communication protocol stack, a PHY SDU or a MAC PDU to a PDCP layer entity of a first network protocol stack as a PDCP SDU of the PDCP layer entity of the first network protocol stack; and/or
- receiving, by a PHY layer entity of the external device communication protocol stack, a PDCP SDU sent by a PDCP layer entity of a first network protocol stack as a PHY SDU or a MAC PDU of the PHY layer entity of the external device communication protocol stack.

In this way, the PHY SDU of the external device may be sent by using the first network protocol stack.

For example, as shown in FIG. 3, if the first network protocol stack is an LTE protocol stack, the process of sending data by using the LTE protocol stack may be:
- sending, by a PHY layer entity of the external device communication protocol stack, a PHY SDU or a MAC PDU to a PDCP layer entity of an LTE protocol stack as a PDCP SDU of the PDCP layer entity of the LTE protocol stack.

The process of receiving data by using the LTE protocol stack may be:
- receiving, by a PHY layer entity of the external device communication protocol stack, a PDCP SDU sent by a PDCP layer entity of an LTE protocol stack as a PHY SDU or a MAC PDU of the PHY layer entity of the external device communication protocol stack.

Figure 4:
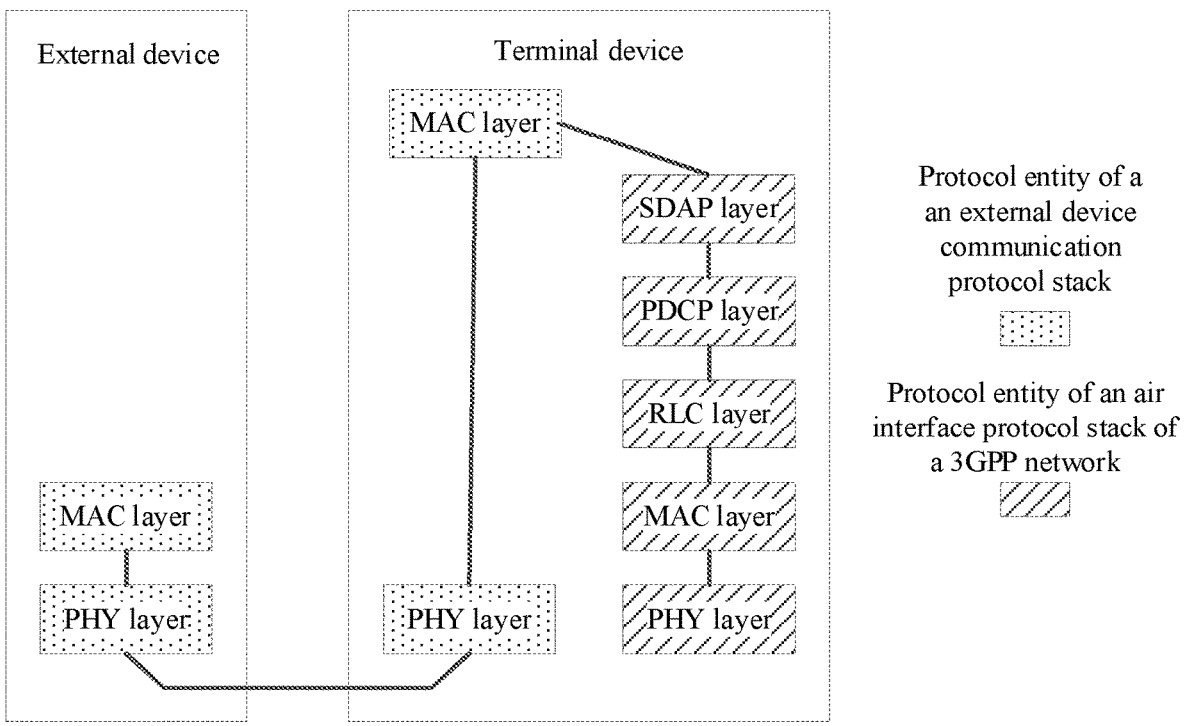
FIG. 4 is a schematic diagram 3 of a protocol stack of a terminal device according to a specific embodiment of the present disclosure.

In a specific embodiment of the present disclosure, in the protocol stack as shown in FIG. 4, the interface information may optionally include at least one of the following:
- a MAC PDU of the external device communication protocol is used as an SDAP SDU of a second network protocol to receive or send the data;
- a DRB identifier of a second network protocol corresponding to data (for example, entire data) or a data flow (for example, a part of data) of the external device communication protocol;
- a PDU session identifier of a second network protocol corresponding to data (for example, entire data) or a data flow (for example, a part of data) of the external device communication protocol;
- a quality of service (QoS) flow identifier of a second network protocol corresponding to data (for example, entire data) or a data flow (for example, a part of data) of the external device communication protocol; or
- an SDAP entity identifier of a second network protocol corresponding to data (for example, entire data) or a data flow (for example, a part of data) of the external device communication protocol.

The second network protocol may be understood as a 5G NR protocol, and the second network protocol stack may be understood as a 5G NR protocol stack. As shown in FIG. 4, the second network protocol stack may include an SDAP layer, a PDCP layer, an RLC layer, a MAC layer, and a PHY layer, and the external device communication protocol stack may include a MAC layer and a PHY layer. The MAC layer entity of the external device communication protocol stack may interact with the SDAP layer entity of the second network protocol stack, that is, receive or send data by using the SDAP layer entity of the second network protocol stack.

Further, as shown in FIG. 4, step 102 may include:
- sending, by a MAC layer entity of the external device communication protocol stack, a MAC PDU to an SDAP layer entity of a second network protocol stack as the SDAP SDU of the SDAP layer entity of the second network protocol stack; and/or
- receiving, by a MAC layer entity of the external device communication protocol stack, an SDAP SDU sent by an SDAP layer entity of a second network protocol stack as a MAC PDU of the MAC layer entity of the external device communication protocol stack.

In this way, the MAC PDU of the external device may be sent by using the second network protocol stack.

For example, as shown in FIG. 4, if the second network protocol stack is an NR protocol stack, the process of sending data by using the NR protocol stack may be:
- S1: A PHY layer entity of the external device communication protocol stack sends a PHY SDU to a MAC layer entity of the external device communication protocol stack as a MAC PDU of the MAC layer entity of the external device communication protocol stack.
- S2: A MAC layer entity of the external device communication protocol stack sends a MAC PDU to an SDAP layer entity of an NR protocol stack as an SDAP SDU of the SDAP layer entity of the NR protocol stack.

The process of receiving data by using the NR protocol stack may be:
- S1: The MAC layer entity of the external device communication protocol stack receives an SDAP SDU sent by the SDAP layer entity of the NR protocol stack as a MAC PDU of the MAC layer entity of the external device communication protocol stack.
- S2: A MAC layer entity of the external device communication protocol stack sends a MAC PDU to a PHY layer entity of the external device communication protocol stack as a PHY SDU of the PHY layer entity of the external device communication protocol stack.

Figure 5:
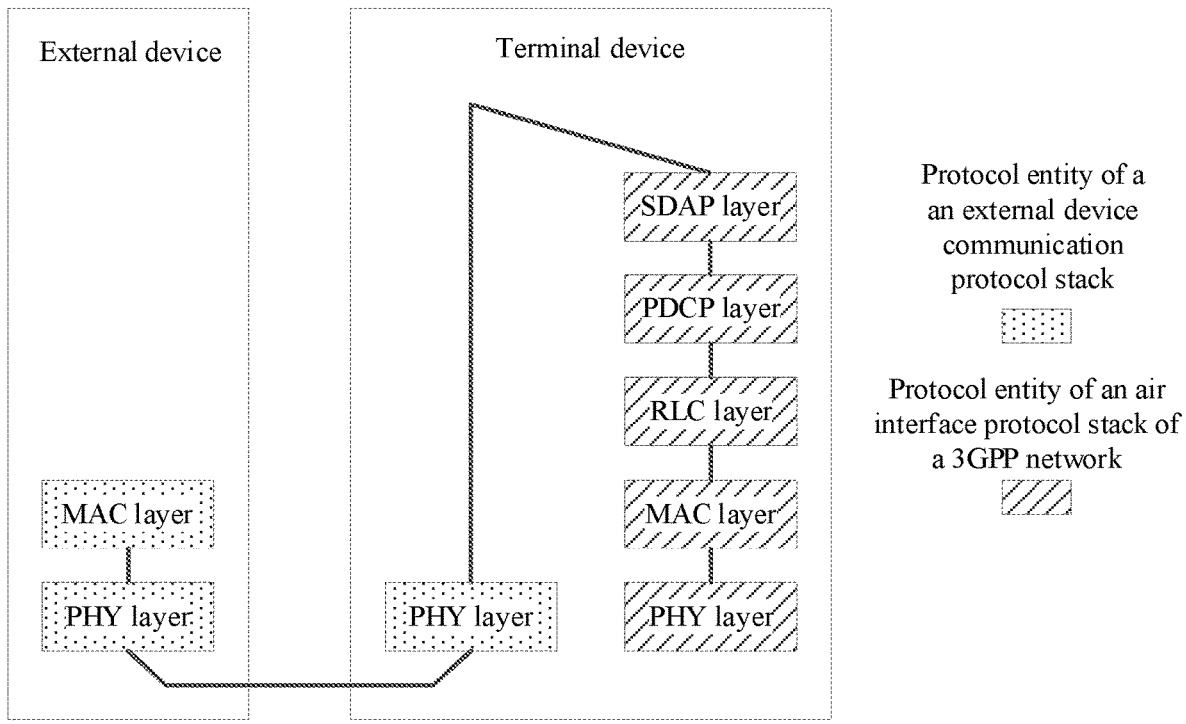
FIG. 5 is a schematic diagram 4 of a protocol stack of a terminal device according to a specific embodiment of the present disclosure.

In a specific embodiment of the present disclosure, in the protocol stack as shown in FIG. 5, the interface information may optionally include at least one of the following:
- a PHY SDU or a MAC PDU of the external device communication protocol is used as an SDAP SDU of a second network protocol to receive or send the data;

a DRB identifier of a second network protocol corresponding to data (for example, entire data) or a data flow (for example, a part of data) of the external device communication protocol;

a PDU session identifier of a second network protocol corresponding to data (for example, entire data) or a data flow (for example, a part of data) of the external device communication protocol;

a QoS flow identifier of a second network protocol corresponding to data (for example, entire data) or a data flow (for example, a part of data) of the external device communication protocol; or an SDAP entity identifier of a second network protocol corresponding to data (for example, entire data) or a data flow (for example, a part of data) of the external device communication protocol.

The second network protocol may be understood as a 5G NR protocol, and the second network protocol stack may be understood as a 5G NR protocol stack. As shown in FIG. 5, the second network protocol stack may include an SDAP layer, a PDCP layer, an RLC layer, a MAC layer, and a PHY layer, and the external device communication protocol stack may include a MAC layer and a PHY layer. The PHY layer entity of the external device communication protocol stack may interact with the SDAP layer entity of the second network protocol stack, that is, receive or send data by using the SDAP layer entity of the second network protocol stack.

Further, as shown in FIG. 5, step 102 may include:

sending, by a PHY layer entity of the external device communication protocol stack, a PHY SDU or a MAC PDU to an SDAP layer entity of a second network protocol stack as an SDAP SDU of the SDAP layer entity of the second network protocol stack; and/or receiving, by a PHY layer entity of the external device communication protocol stack, an SDAP SDU sent by an SDAP layer entity of a second network protocol stack as a PHY SDU or a MAC PDU of the PHY layer entity of the external device communication protocol stack.

In this way, the PHY SDU of the external device may be sent by using the second network protocol stack.

For example, as shown in FIG. 5, if the second network protocol stack is an NR protocol stack, the process of sending data by using the NR protocol stack may be:

A PHY layer entity of the external device communication protocol stack sends a PHY SDU or a MAC PDU to an SDAP layer entity of an NR protocol stack as an SDAP SDU of the SDAP layer entity of the NR protocol stack.

The process of receiving data by using the NR protocol stack may be:

receiving, by a PHY layer entity of the external device communication protocol stack, an SDAP SDU sent by an SDAP layer entity of an NR protocol stack as a PHY SDU or a MAC PDU of the PHY layer entity of the external device communication protocol stack.

Figure 6:
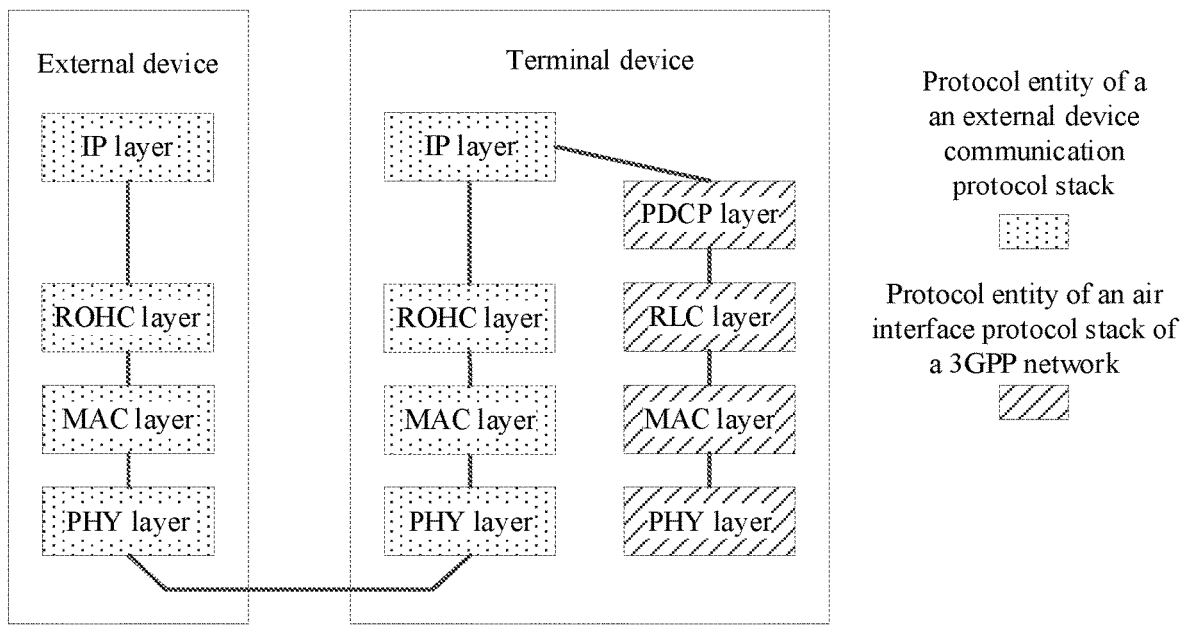
FIG. 6 is a schematic diagram 5 of a protocol stack of a terminal device according to a specific embodiment of the present disclosure.

In a specific embodiment of the present disclosure, in the protocol stack as shown in FIG. 6, the interface information may optionally include at least one of the following:

an IP PDU of the external device communication protocol is used as a PDCP SDU of a first network protocol to receive or send the data;

a DRB identifier of a first network protocol corresponding to data (for example, entire data) or a data flow (for example, a part of data) of the external device communication protocol;

an EPS bearer identifier of a first network protocol corresponding to data (for example, entire data) or a data flow (for example, a part of data) of the external device communication protocol; or a PDCP entity identifier of a first network protocol corresponding to data (for example, entire data) or a data flow (for example, a part of data) of the external device communication protocol.

The first network protocol may be understood as a 4G LTE protocol, and the first network protocol stack may be understood as a 4G LTE protocol stack. As shown in FIG. 6, the first network protocol stack may include a PDCP layer, an RLC layer, a MAC layer, and a PHY layer; and the external device communication protocol stack may include an IP layer, a robust header compression (ROHC) layer, a MAC layer, and a PHY layer, that is, the ROHC layer between the IP layer and the MAC layer is introduced. The IP layer entity of the external device communication protocol stack may interact with the PDCP layer entity of the first network protocol stack, that is, receive or send data by using the PDCP layer entity of the first network protocol stack.

Further, as shown in FIG. 6, step 102 may include:

sending, by an IP layer entity of the external device communication protocol stack, an IP PDU to a PDCP layer entity of a first network protocol stack as a PDCP SDU of the PDCP layer entity of the first network protocol stack; and/or receiving, by an IP layer entity of the external device communication protocol stack, a PDCP SDU sent by a PDCP layer entity of a first network protocol stack as an IP PDU of the IP layer entity of the external device communication protocol stack.

In this way, the IP PDU of the external device may be sent by using the first network protocol stack. The ROHC layer between the IP layer and the MAC layer is introduced, so that a data packet compressed or decompressed by the ROHC layer entity may be transmitted by using the air interface protocol stack of the 3GPP network.

For example, as shown in FIG. 6, if the first network protocol stack is an LTE protocol stack, the process of sending data by using the LTE protocol stack may be:

S1: A PHY layer entity of the external device communication protocol stack sends a PHY SDU to a MAC layer entity of the external device communication protocol stack as a MAC PDU of the MAC layer entity of the external device communication protocol stack.

S2: A MAC layer entity of the external device communication protocol stack sends a MAC SDU to an ROHC layer entity of the external device communication protocol stack as an ROHC PDU of the ROHC layer entity of the external device communication protocol stack.

S3: An ROHC layer entity of the external device communication protocol stack sends an ROHC SDU to an IP layer entity of the external device communication protocol stack as an IP PDU of the IP layer entity of the external device communication protocol stack.

S4: An IP layer entity of the external device communication protocol stack sends an IP PDU to a PDCP layer entity of an LTE protocol stack as a PDCP SDU of the PDCP layer entity of the LTE protocol stack.

The process of receiving data by using the LTE protocol stack may be:

S1: An IP layer entity of the external device communication protocol stack receives a PDCP SDU sent by a PDCP layer entity of the LTE protocol stack as an IP PDU of the IP layer entity of the external device communication protocol stack.

S2: An IP layer entity of the external device communication protocol stack sends an IP PDU to an ROHC layer entity of the external device communication protocol stack as an ROHC SDU of the ROHC layer entity of the external device communication protocol stack.

S3: An ROHC layer entity of the external device communication protocol stack sends an ROHC PDU to a MAC layer entity of the external device communication protocol stack as a MAC SDU of the MAC layer entity of the external device communication protocol stack.

Figure 7:
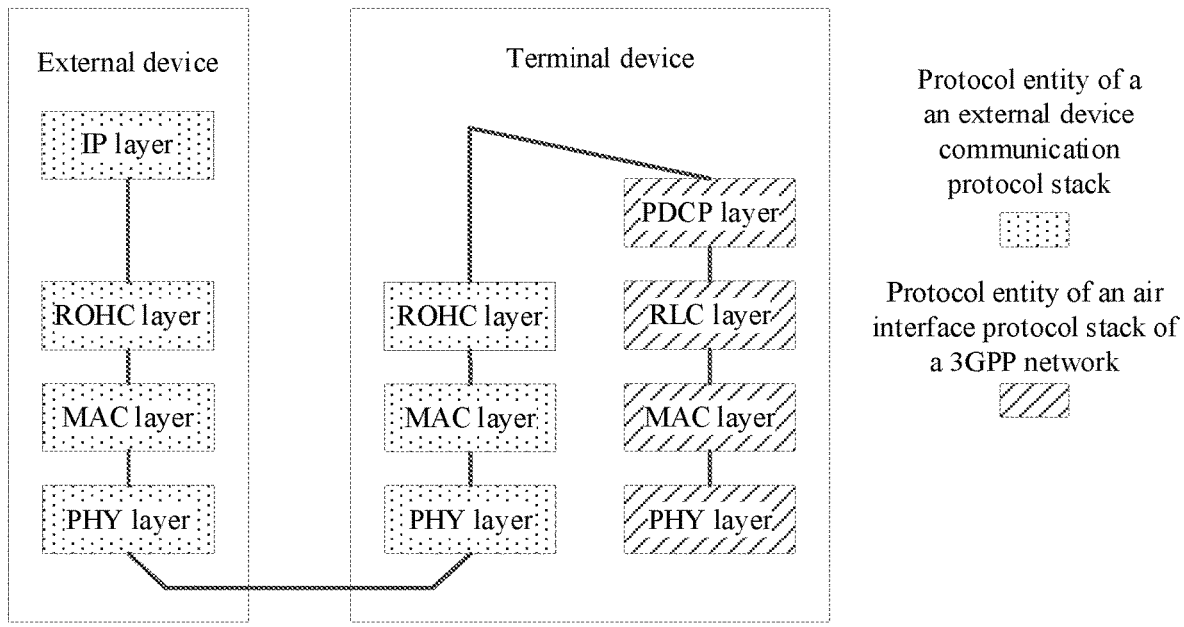
FIG. 7 is a schematic diagram 6 of a protocol stack of a terminal device according to a specific embodiment of the present disclosure.

In a specific embodiment of the present disclosure, in the protocol stack as shown in FIG. 7, the interface information may optionally include at least one of the following:

- an ROHC SDU or an IP PDU of the external device communication protocol is used as a PDCP SDU of a first network protocol to receive or send the data;
- a DRB identifier of a first network protocol corresponding to data (for example, entire data) or a data flow (for example, a part of data) of the external device communication protocol;
- an EPS bearer identifier of a first network protocol corresponding to data (for example, entire data) or a data flow (for example, a part of data) of the external device communication protocol; or
- a PDCP entity identifier of a first network protocol corresponding to data (for example, entire data) or a data flow (for example, a part of data) of the external device communication protocol.

The first network protocol may be understood as a 4G LTE protocol, and the first network protocol stack may be understood as a 4G LTE protocol stack. As shown in FIG. 7, the first network protocol stack may include a PDCP layer, an RLC layer, a MAC layer, and a PHY layer, and the external device communication protocol stack may include an IP layer, an ROHC layer, a MAC layer, and a PHY layer, that is, the ROHC layer between the IP layer and the MAC layer is introduced. The ROHC layer entity of the external device communication protocol stack may interact with the PDCP layer entity of the first network protocol stack, that is, receive or send data by using the PDCP layer entity of the first network protocol stack.

Further, as shown in FIG. 6, step 102 may include:
sending, by an ROHC layer entity of the external device communication protocol stack, an ROHC SDU or an IP PDU to a PDCP layer entity of a first network protocol stack as a PDCP SDU of the PDCP layer entity of the first network protocol stack; and/or receiving, by an ROHC layer entity of the external device communication protocol stack, a PDCP SDU sent by a PDCP layer entity of a first network protocol stack as an ROHC SDU or an IP PDU of the ROHC layer entity of the external device communication protocol stack.

In this way, the ROHC SDU of the external device may be sent by using the first network protocol stack.

For example, as shown in FIG. 7, if the first network protocol stack is an LTE protocol stack, the process of sending data by using the LTE protocol stack may be:

S1: A PHY layer entity of the external device communication protocol stack sends a PHY SDU to a MAC layer entity of the external device communication protocol stack as a MAC PDU of the MAC layer entity of the external device communication protocol stack.

S2: A MAC layer entity of the external device communication protocol stack sends a MAC SDU to an ROHC layer entity of the external device communication protocol stack as an ROHC PDU of the ROHC layer entity of the external device communication protocol stack.

S3: An ROHC layer entity of the external device communication protocol stack sends an ROHC SDU or an IP PDU to a PDCP layer entity of an LTE protocol stack as a PDCP SDU of the PDCP layer entity of the LTE protocol stack.

The process of receiving data by using the LTE protocol stack may be:

S1: An ROHC layer entity of the external device communication protocol stack receives a PDCP SDU sent by a PDCP layer entity of an LTE protocol stack as a ROHC SDU or an IP PDU of the ROHC layer entity of the external device communication protocol stack.

S2: An ROHC layer entity of the external device communication protocol stack sends an ROHC PDU to a MAC layer entity of the external device communication protocol stack as a MAC SDU of the MAC layer entity of the external device communication protocol stack.

Figure 8:
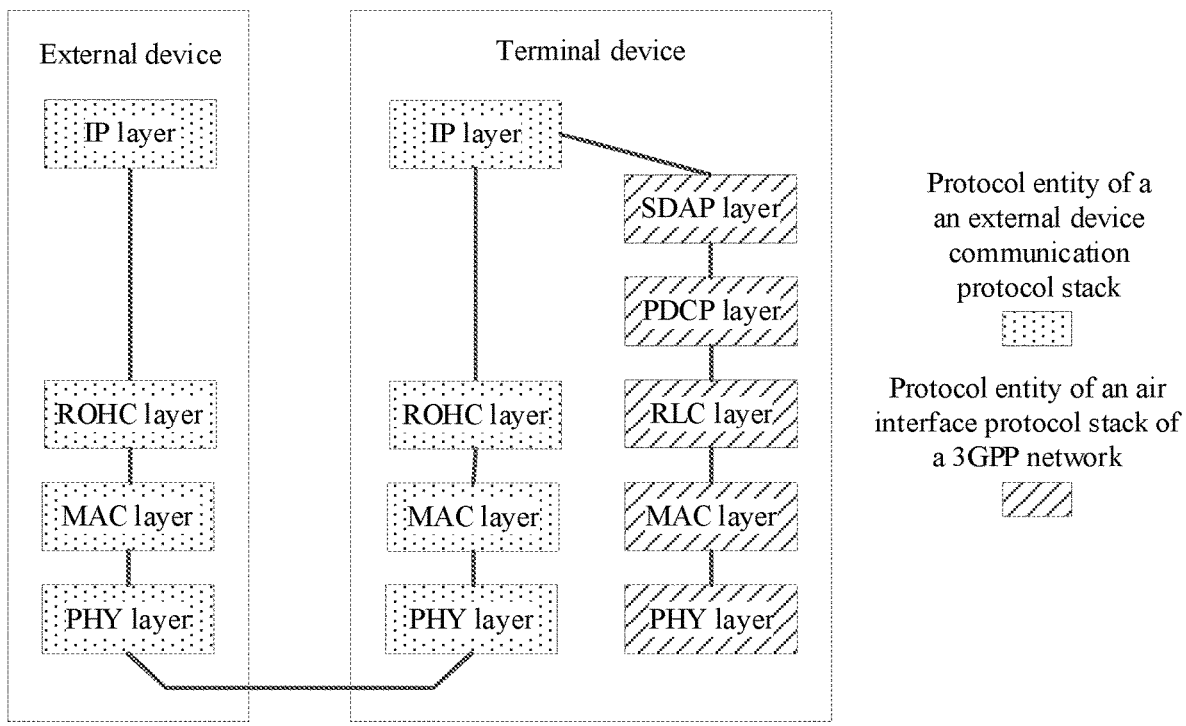
FIG. 8 is a schematic diagram 7 of a protocol stack of a terminal device according to a specific embodiment of the present disclosure.

In a specific embodiment of the present disclosure, in the protocol stack as shown in FIG. 8, the interface information may optionally include at least one of the following:

- an IP PDU of the external device communication protocol is used as an SDAP SDU of a second network protocol to receive or send the data;
- a DRB identifier of a second network protocol corresponding to data (for example, entire data) or a data flow (for example, a part of data) of the external device communication protocol;
- a PDU session identifier of a second network protocol corresponding to data (for example, entire data) or a data flow (for example, a part of data) of the external device communication protocol;
- a QoS flow identifier of a second network protocol corresponding to data (for example, entire data) or a data flow (for example, a part of data) of the external device communication protocol; or
- an SDAP entity identifier of a second network protocol corresponding to data (for example, entire data) or a data flow (for example, a part of data) of the external device communication protocol.

The second network protocol may be understood as a 5G NR protocol, and the second network protocol stack may be understood as a 5G NR protocol stack. As shown in FIG. 8, the second network protocol stack may include an SDAP layer, a PDCP layer, an RLC layer, a MAC layer, and a PHY layer, and the external device communication protocol stack may include an IP layer, an ROHC layer, a MAC layer, and a PHY layer, that is, the ROHC layer between the IP layer and the MAC layer is introduced. The PHY layer entity of the external device communication protocol stack may interact with the SDAP layer entity of the second network protocol stack, that is, receive or send data by using the SDAP layer entity of the second network protocol stack.

Further, as shown in FIG. 8, step 102 may include:
sending, by an IP layer entity of the external device communication protocol stack, an IP PDU to an SDAP layer entity of a second network protocol stack as an SDAP SDU of the SDAP layer entity of the second network protocol stack; and/or receiving, by an IP layer entity of the external device communication protocol stack, an SDAP SDU sent by an SDAP layer entity of a second network protocol stack as an IP PDU of the IP layer entity of the external device communication protocol stack.

In this way, the IP PDU of the external device may be sent by using the second network protocol stack.

For example, as shown in FIG. 8, if the second network protocol stack is an NR protocol stack, the process of sending data by using the NR protocol stack may be:
- S1: A PHY layer entity of the external device communication protocol stack sends a PHY SDU to a MAC layer entity of the external device communication protocol stack as a MAC PDU of the MAC layer entity of the external device communication protocol stack.
- S2: A MAC layer entity of the external device communication protocol stack sends a MAC SDU to an ROHC layer entity of the external device communication protocol stack as an ROHC PDU of the ROHC layer entity of the external device communication protocol stack.
- S3: An ROHC layer entity of the external device communication protocol stack sends an ROHC SDU to an IP layer entity of the external device communication protocol stack as an IP PDU of the IP layer entity of the external device communication protocol stack.
- S4: An IP layer entity of the external device communication protocol stack sends an IP PDU to an SDAP layer entity of an NR protocol stack as an SDAP SDU of the SDAP layer entity of the NR protocol stack.

The process of receiving data by using the NR protocol stack may be:
- S1: An IP layer entity of the external device communication protocol stack receives an SDAP SDU sent by a SDAP layer entity of an NR protocol stack as an IP PDU of the IP layer entity of the external device communication protocol stack.
- S2: An IP layer entity of the external device communication protocol stack sends an IP PDU to an ROHC layer entity of the external device communication protocol stack as an ROHC SDU of the ROHC layer entity of the external device communication protocol stack.
- S3: An ROHC layer entity of the external device communication protocol stack sends an ROHC PDU to a MAC layer entity of the external device communication protocol stack as a MAC SDU of the MAC layer entity of the external device communication protocol stack.

Figure 9:
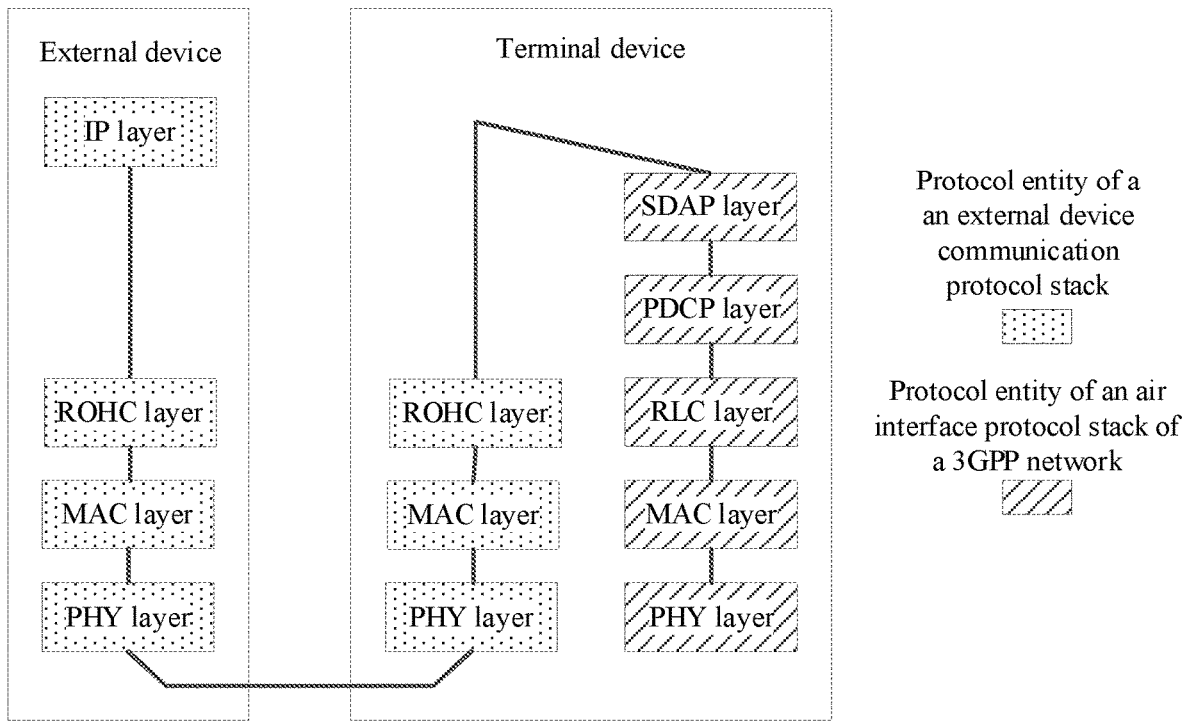
FIG. 9 is a schematic diagram 8 of a protocol stack of a terminal device according to a specific embodiment of the present disclosure.

In a specific embodiment of the present disclosure, in the protocol stack as shown in FIG. 9, the interface information may optionally include at least one of the following:
- an ROHC SDU or an IP PDU of the external device communication protocol is used as an SDAP SDU of a second network protocol to receive or send the data;
- a DRB identifier of a second network protocol corresponding to data (for example, entire data) or a data flow (for example, a part of data) of the external device communication protocol;
- a PDU session identifier of a second network protocol corresponding to data (for example, entire data) or a data flow (for example, a part of data) of the external device communication protocol;
- a QoS flow identifier of a second network protocol corresponding to data (for example, entire data) or a data flow (for example, a part of data) of the external device communication protocol; or
- an SDAP entity identifier of a second network protocol corresponding to data (for example, entire data) or a data flow (for example, a part of data) of the external device communication protocol.

The second network protocol may be understood as a 5G NR protocol, and the second network protocol stack may be understood as a 5G NR protocol stack. As shown in FIG. 9, the second network protocol stack may include an SDAP layer, a PDCP layer, an RLC layer, a MAC layer, and a PHY layer, and the external device communication protocol stack may include an IP layer, an ROHC layer, a MAC layer, and a PHY layer, that is, the ROHC layer between the IP layer and the MAC layer is introduced. The ROHC layer entity of the external device communication protocol stack may interact with the SDAP layer entity of the second network protocol stack, that is, receive or send data by using the SDAP layer entity of the second network protocol stack.

Further, as shown in FIG. 9, step 102 may include:
- sending, by an ROHC layer entity of the external device communication protocol stack, an ROHC SDU or an IP PDU to an SDAP layer entity of a second network protocol stack as an SDAP SDU of the SDAP layer entity of the second network protocol stack; and/or
- receiving, by an ROHC layer entity of the external device communication protocol stack, an SDAP SDU sent by an SDAP layer entity of a second network protocol stack as an ROHC SDU or an IP PDU of the ROHC layer entity of the external device communication protocol stack.

In this way, the ROHC SDU of the external device may be sent by using the second network protocol stack.

For example, as shown in FIG. 9, if the second network protocol stack is an NR protocol stack, the process of sending data by using the NR protocol stack may be:
- sending, by an ROHC layer entity of the external device communication protocol stack, an ROHC SDU or an IP PDU to an SDAP layer entity of an NR protocol stack as an SDAP SDU of the SDAP layer entity of the NR protocol stack.

The process of receiving data by using the NR protocol stack may be:
- receiving, by an ROHC layer entity of the external device communication protocol stack, an SDAP SDU sent by an SDAP layer entity of an NR protocol stack as an ROHC SDU or an IP PDU of the ROHC layer entity of the external device communication protocol stack.

The data transmission method in the present disclosure is described in the foregoing embodiment. A terminal device in the present disclosure is described below with reference to embodiments and accompanying drawings.

Figure 10:
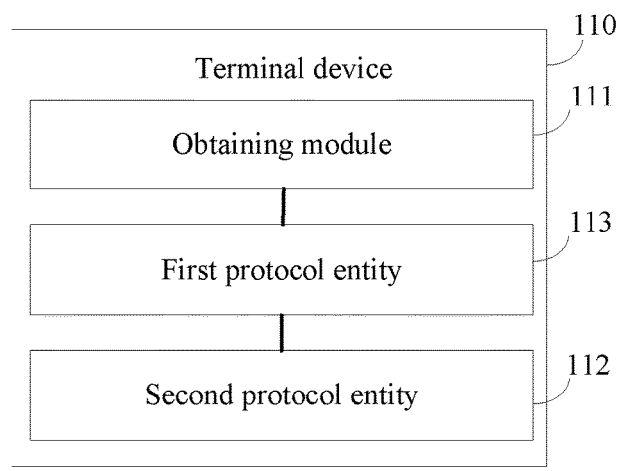
FIG. 10 is a structural schematic diagram 1 of a terminal device according to an embodiment of the present disclosure.

Referring to FIG. 10, an embodiment of the present disclosure further provides a terminal device 110, including:
- an obtaining module 111, configured to obtain interface information of an external device communication protocol and a 3GPP network protocol;
- a second protocol entity 112, where the second protocol entity is a protocol entity corresponding to an air interface protocol stack of a 3GPP network of the terminal device; and
- a first protocol entity 113, where the first protocol entity is a protocol entity corresponding to a communication protocol stack of an external device of the terminal device, and is configured to receive or send data according to interface information by using the second protocol entity.

In the embodiments of the present disclosure, the first protocol entity of the external device communication protocol stack of the terminal device receives or sends the data according to the obtained interface information of the external device communication protocol and the 3GPP network protocol by using the second protocol entity of the air interface protocol stack of the 3GPP network, and interaction between the external device communication protocol stack and the air interface protocol stack of the 3GPP network may be implemented. Therefore, when a network node of WiFi, bluetooth, a wired local area network, or the like communicates with another network node by using a 3GPP network of a terminal device, the data transmission requirement may be satisfied, and smooth execution of a related communication service is ensured.

In this embodiment of the present disclosure, optionally, the external device communication protocol includes any one of the following:

a WiFi communication protocol;
a bluetooth protocol; or
a wired local area network communication protocol.

Optionally, the interface information includes at least one of the following:

a MAC PDU of the external device communication protocol is used as a PDCP SDU of a first network protocol to receive or send the data;
a DRB identifier of a first network protocol corresponding to data or a data flow of the external device communication protocol; or
an EPS bearer identifier of a first network protocol corresponding to data or a data flow of the external device communication protocol; or
a PDCP entity identifier of a first network protocol corresponding to data or a data flow of the external device communication protocol.

Further, the first protocol entity 113 is a MAC layer entity of the external device communication protocol stack, and the second protocol entity 112 is a PDCP layer entity of the first network protocol stack. The first protocol entity 113 may be configured to:

send a MAC PDU to a PDCP layer entity of a first network protocol stack; and/or
receive a PDCP SDU sent by a PDCP layer entity of a first network protocol stack.

Optionally, the interface information includes at least one of the following:

a PHY SDU or a MAC PDU of the external device communication protocol is used as a PDCP SDU of a first network protocol to receive or send the data;
a DRB identifier of a first network protocol corresponding to data or a data flow of the external device communication protocol; or
an EPS bearer identifier of a first network protocol corresponding to data or a data flow of the external device communication protocol; or
a PDCP entity identifier of a first network protocol corresponding to data or a data flow of the external device communication protocol.

Further, the first protocol entity 113 is a PHY layer entity of the external device communication protocol stack, and the second protocol entity 112 is a PDCP layer entity of the first network protocol stack. The first protocol entity 113 may be configured to:

send a PHY SDU or a MAC PDU to a PDCP layer entity of a first network protocol stack; and/or
receive a PDCP SDU sent by a PDCP layer entity of a first network protocol stack.

Optionally, the interface information includes at least one of the following:

a MAC PDU of the external device communication protocol is used as an SDAP SDU of a second network protocol to receive or send the data;
a DRB identifier of a second network protocol corresponding to data or a data flow of the external device communication protocol;
a PDU session identifier of a second network protocol corresponding to data or a data flow of the external device communication protocol; or
a QoS flow identifier of a second network protocol corresponding to data or a data flow of the external device communication protocol; or
an SDAP entity identifier of a second network protocol corresponding to data or a data flow of the external device communication protocol.

Further, the first protocol entity 113 is a MAC layer entity of the external device communication protocol stack, and the second protocol entity 112 is an SDAP layer entity of the second network protocol stack. The first protocol entity 113 may be configured to:

send a MAC PDU to an SDAP layer entity of a second network protocol stack; and/or
receive an SDAP SDU sent by an SDAP layer entity of a second network protocol stack.

Optionally, the interface information includes at least one of the following:

a PHY SDU or a MAC PDU of the external device communication protocol is used as an SDAP SDU of a second network protocol to receive or send the data;
a DRB identifier of a second network protocol corresponding to data or a data flow of the external device communication protocol;
a PDU session identifier of a second network protocol corresponding to data or a data flow of the external device communication protocol;
a QoS flow identifier of a second network protocol corresponding to data or a data flow of the external device communication protocol; or
an SDAP entity identifier of a second network protocol corresponding to data or a data flow of the external device communication protocol.

Further, the first protocol entity 113 is a PHY layer entity of the external device communication protocol stack, and the second protocol entity 112 is an SDAP layer entity of the second network protocol stack. The first protocol entity 113 may be configured to:

send a PHY SDU or a MAC PDU to an SDAP layer entity of a second network protocol stack; and/or
receive an SDAP SDU sent by an SDAP layer entity of a second network protocol stack.

Optionally, the interface information includes at least one of the following:

an IP PDU of the external device communication protocol is used as a PDCP SDU of a first network protocol to receive or send the data;
a DRB identifier of a first network protocol corresponding to data or a data flow of the external device communication protocol;
an EPS bearer identifier of a first network protocol corresponding to data or a data flow of the external device communication protocol; or
a PDCP entity identifier of a first network protocol corresponding to data or a data flow of the external device communication protocol.

Further, the first protocol entity 113 is an IP layer entity of the external device communication protocol stack, and the second protocol entity 112 is a PDCP layer entity of the first network protocol stack. The first protocol entity 113 may be configured to:

send an IP PDU to a PDCP layer entity of a first network protocol stack; and/or
receive a PDCP SDU sent by a PDCP layer entity of a first network protocol stack.

Optionally, the interface information includes at least one of the following:

an ROHC SDU or an IP PDU of the external device communication protocol is used as a PDCP SDU of a first network protocol to receive or send the data;

a DRB identifier of a first network protocol corresponding to data or a data flow of the external device communication protocol;

an EPS bearer identifier of a first network protocol corresponding to data or a data flow of the external device communication protocol; or a PDCP entity identifier of a first network protocol corresponding to data or a data flow of the external device communication protocol.

Further, the first protocol entity 113 is an ROHC layer entity of the external device communication protocol stack, and the second protocol entity 112 is a PDCP layer entity of the first network protocol stack. The first protocol entity 113 may be configured to:

send an ROHC SDU or an IP PDU to a PDCP layer entity of a first network protocol stack; and/or receive a PDCP SDU sent by a PDCP layer entity of a first network protocol stack.

Optionally, the interface information includes at least one of the following:

an IP PDU of the external device communication protocol is used as an SDAP SDU of a second network protocol to receive or send the data;

a DRB identifier of a second network protocol corresponding to data or a data flow of the external device communication protocol;

a PDU session identifier of a second network protocol corresponding to data or a data flow of the external device communication protocol;

a QoS flow identifier of a second network protocol corresponding to data or a data flow of the external device communication protocol; or an SDAP entity identifier of a second network protocol corresponding to data or a data flow of the external device communication protocol.

Further, the first protocol entity 113 is an IP layer entity of the external device communication protocol stack, and the second protocol entity 112 is an SDAP layer entity of the second network protocol stack. The first protocol entity 113 may be configured to:

send an IP PDU to an SDAP layer entity of a second network protocol stack; and/or receive an SDAP SDU sent by an SDAP layer entity of a second network protocol stack.

Optionally, the interface information includes at least one of the following:

an ROHC SDU or an IP PDU of the external device communication protocol is used as an SDAP SDU of a second network protocol to receive or send the data;

a DRB identifier of a second network protocol corresponding to data or a data flow of the external device communication protocol;

a PDU session identifier of a second network protocol corresponding to data or a data flow of the external device communication protocol;

a QoS flow identifier of a second network protocol corresponding to data or a data flow of the external device communication protocol; or an SDAP entity identifier of a second network protocol corresponding to data or a data flow of the external device communication protocol.

Further, the first protocol entity 113 is an ROHC layer entity of the external device communication protocol stack, and the second protocol entity 112 is an SDAP layer entity of the second network protocol stack. The first protocol entity 113 may be configured to:

send an ROHC SDU or an IP PDU to an SDAP layer entity of a second network protocol stack; and/or receive an SDAP SDU sent by an SDAP layer entity of a second network protocol stack.

An embodiment of the present disclosure further provides a terminal device, including a processor, a memory, and a computer program that is stored on the memory and can run on the processor. When the computer program is executed by the processor, processes in the embodiments of the foregoing data transmission method are implemented, and can achieve a same technical effect. To avoid repetition, details are not described again herein.

Figure 11:
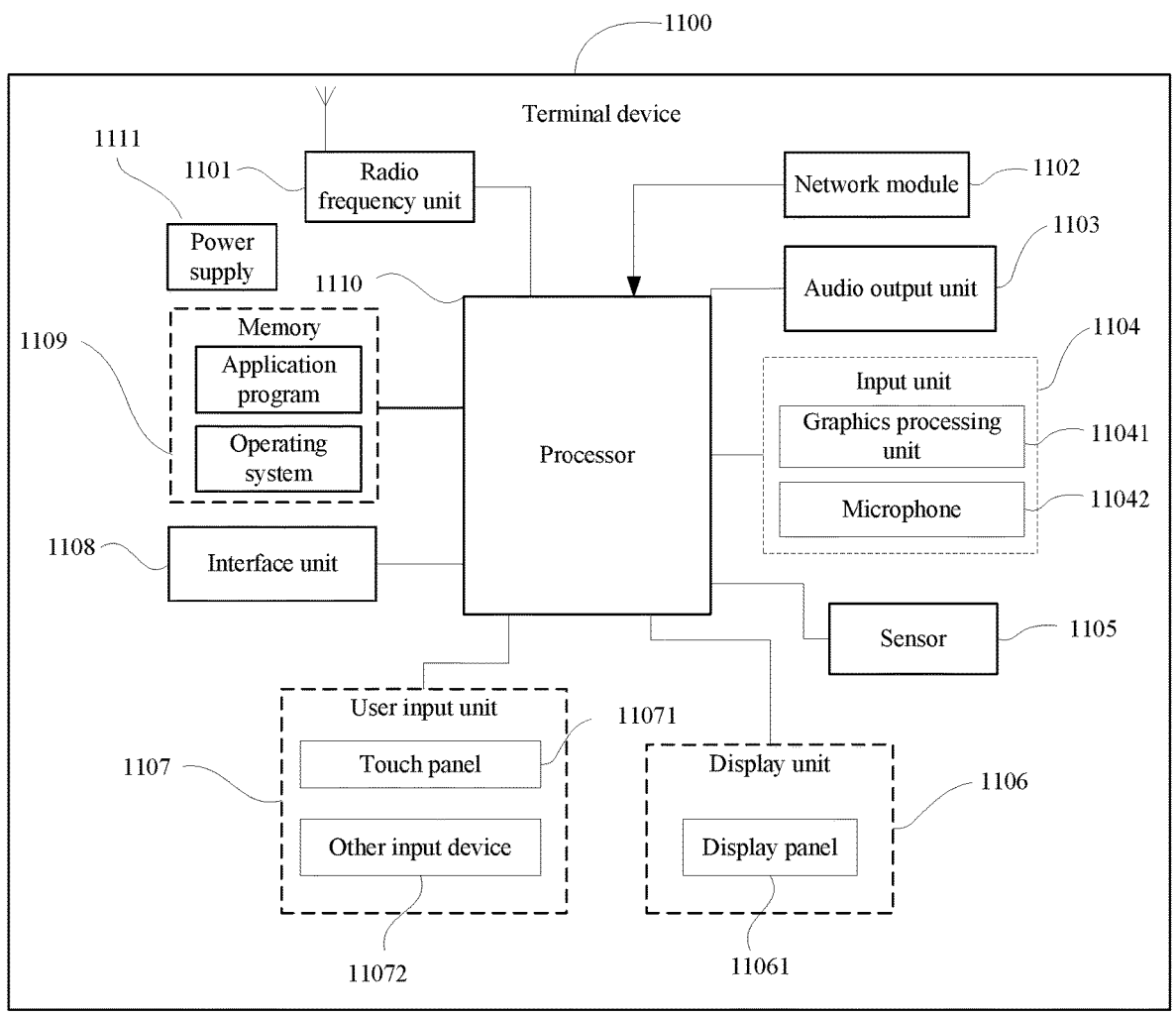
FIG. 11 is a structural schematic diagram 2 of a terminal device according to an embodiment of the present disclosure.

Specifically, FIG. 11 is a schematic structural diagram of hardware of a terminal device implementing embodiments of the present disclosure. The terminal device 1100 includes but is not limited to: a radio frequency unit 1101, a network module 1102, an audio output unit 1103, an input unit 1104, a sensor 1105, a display unit 1106, a user input unit 1107, an interface unit 1108, a memory 1109, a processor 1110, a power supply 1111, and other components. A person skilled in the art may understand that the structure of the terminal shown in FIG. 11 does not constitute a limitation to the terminal. The terminal may include more or fewer components than those shown in the figure, or some components may be combined, or there may be a different component arrangement. In this embodiment of the present disclosure, the terminal device includes but is not limited to a mobile phone, a tablet computer, a notebook computer, a palmtop computer, a vehicle-mounted terminal, a wearable device, a pedometer, or the like.

In the embodiments of the present disclosure, the terminal device 1100 may further include the external device communication protocol stack and the air interface protocol stack of the 3GPP network, and the external device communication protocol may be used to implement communication between the terminal device 1100 and the external device.

The processor 1110 is configured to: obtain interface information of an external device communication protocol and a 3GPP network protocol; and control a first protocol entity of an external device communication protocol stack according to the interface information to receive or send data through a second protocol entity of an air interface protocol stack of a 3GPP network.

In the embodiments of the present disclosure, the terminal device 1100 may implement interaction between the external device communication protocol stack and the air interface protocol stack of the 3GPP network. Therefore, when a network node of WiFi, bluetooth, a wired local area network, or the like communicates with another network node by using a 3GPP network of a terminal device, the data transmission requirement may be satisfied, and smooth execution of a related communication service is ensured.

It should be understood that, in this embodiment of the present disclosure, the radio frequency unit 1101 may be configured to receive and transmit information, or receive and transmit signals during a call. Specifically, the radio frequency unit 1101 receives downlink data from a base station, and transmits the downlink data to the processor 1110 for processing; and in addition, transmits uplink data to the base station. Generally, the radio frequency unit 1101 includes, but is not limited to, an antenna, at least one amplifier, a transceiver, a coupler, a low noise amplifier, a duplexer, and the like. In addition, the radio frequency unit

1101 may further communicate with another device by using a wireless communications system and network.

The terminal device provides a user with wireless broadband Internet access through the network module 1102, for example, helps the user send and receive emails, browse web pages, and access streaming media.

The audio output unit 1103 can convert audio data received by the radio frequency unit 1101 or the network module 1102 or stored in the memory 1109 into an audio signal, and output the audio signal as sound. In addition, the audio output unit 1103 may further provide audio output (for example, call signal receiving sound or message receiving sound) related to a specific function performed by the terminal device 1100. The audio output unit 1103 includes a loudspeaker, a buzzer, a telephone receiver, and the like.

The input unit 1104 is configured to receive an audio signal or a video signal. The input unit 1104 can include a graphics processing unit (GPU) 11041 and a microphone 11042. The graphics processing unit 11041 processes image data of static pictures or videos obtained by an image capturing apparatus (for example, a camera) in a video capturing mode or an image capturing mode. A processed image frame can be displayed on the display unit 1106. The image frame processed by the graphics processing unit 11041 can be stored in the memory 1109 (or another storage medium) or sent via the radio frequency unit 1101 or the network module 1102. The microphone 11042 may receive sound and can process such sound into audio data. The processed audio data may be converted, in a call mode, into a format that can be sent by the radio frequency unit 1101 to a mobile communication base station for output.

The terminal device 1100 further includes at least one sensor 1105, for example, an optical sensor, a motion sensor, and other sensors. Specifically, the optical sensor includes an ambient light sensor and a proximity sensor. The ambient light sensor may adjust luminance of the display panel 11061 based on brightness of ambient light. The proximity sensor may turn off the display panel 11061 and/or backlight when the terminal device 1100 approaches an ear. As a type of motion sensor, an accelerometer sensor may detect an acceleration value in each direction (generally, three axes), and detect a value and a direction of gravity when the accelerometer sensor is static, and may be configured to recognize a terminal posture (such as switching between landscape and portrait modes, a related game, or magnetometer posture calibration), and perform a function related to vibration recognition (such as a pedometer or a knock), and the like. The sensor 1105 may further include a fingerprint sensor, a pressure sensor, an iris sensor, a molecular sensor, a gyroscope, a barometer, a hygrometer, a thermometer, an infrared sensor, and the like. Details are not described herein again.

The display unit 1106 is configured to display information entered by a user or information provided for the user. The display unit 1106 may include the display panel 11061. The display panel 11061 may be configured in a form of a liquid crystal display (LCD), an organic light-emitting diode (OLED), or the like.

The user input unit 1107 can be configured to receive the inputted digital or character information, and generate key signal input related to user setting and function control of the terminal. Specifically, the user input unit 1107 includes a touch panel 11071 and another input device 11072. The touch panel 11071, also known as a touch screen, can collect a touch operation performed by a user on or near the touch panel (for example, an operation performed by the user on the touch panel 11071 or near the touch panel 11071 with any suitable object or accessory such as a finger or a stylus). The touch panel 11071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 1110, and receives and executes a command from the processor 1110. In addition, the touch panel 11071 may be implemented by using a plurality of types such as a resistive type, a capacitive type, an infrared ray, and a surface acoustic wave. The user input unit 1107 may further include other input devices 11072 in addition to the touch panel 11071. Specifically, the other input devices 11072 may include but are not limited to a physical keyboard, a function key (such as a volume control key or a power on/off key), a trackball, a mouse, a joystick, and the like. Details are not described herein.

Further, the touch panel 11071 can cover the display panel 11061. When detecting a touch operation on or near the touch panel 11071, the touch panel 11071 transmits the touch operation to the processor 1110 to determine a type of a touch event. Then the processor 1110 provides a corresponding visual output on the display panel 11061 based on the type of the touch event. In FIG. 11, the touch panel 11071 and the display panel 11061 are used as two independent components to implement input and output functions of the terminal. However, in some embodiments, the touch panel 11071 and the display panel 11061 may be integrated to implement the input and output functions of the terminal. This is not specifically limited herein.

The interface unit 1108 is an interface for connecting an external apparatus to the terminal device 1100. For example, the external apparatus can include a wired or wireless headphone port, an external power supply (or a battery recharger) port, a wired or wireless data port, a memory card port, a port for connection with an apparatus having an identification module, an audio input/output (I/O) port, a video I/O port, an earphone port, and the like. The interface unit 1108 may be configured to receive input (for example, data information and power) from the external apparatus and transmit the received input to one or more elements in the terminal device 1100, or may be configured to transmit data between the terminal device 1100 and the external apparatus.

The memory 1109 may be configured to store a software program and various data. The memory 1109 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 1109 may include a high-speed random access memory, and may further include a non-volatile memory such as at least one magnetic disk storage component, a flash memory component, or another volatile solid-state storage component.

The processor 1110 is a control center of the terminal device, connects various parts of the entire terminal by using various interfaces and circuits, and performs various functions of the terminal and processes data by running or executing software programs and/or modules stored in the memory 1109 and invoking data stored in the memory 1109, so as to monitor the terminal as a whole. The processor 1110 may include one or more processing units. Optionally, the processor 1110 may integrate an application processor and a modem processor. The application processor mainly processes an operating system, a user interface, an application program, and the like. The modem processor mainly processes wireless communication. It may be understood that, alternatively, the modem processor may not be integrated into the processor 1110.

The terminal device 1100 may further include the power supply 1111 (such as a battery) supplying power to each component. Preferably, the power supply 1111 may be logically connected to the processor 1110 by using a power management system, so as to implement functions such as charging management, discharging management and power consumption management by using the power management system.

In addition, the terminal 1100 may further include some functional modules not shown. Details are not described herein again.

An embodiment of the present disclosure further provides a computer-readable storage medium, where the computer-readable storage medium stores a computer program. When the computer program is executed by a processor, the processes of the foregoing embodiments of the data transmission method are implemented, and can achieve the same technical effects. To avoid repetition, details are not described herein again. The computer-readable storage medium includes a read-only memory (ROM for short), a random access memory (RAM for short), a magnetic disk, an optical disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In the absence of more restrictions, an element defined by the statement "including a . . . " does not preclude the presence of other identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the related art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

Those of ordinary skill in the art can realize that the exemplary units and algorithm steps described with reference to the embodiments disclosed in this specification can be implemented by electronic hardware or a combination of computer software and electronic hardware. Whether these functions are implemented by hardware or software depends on specific applications and design constraints of the technical solutions. A person skilled in the art may use different methods to implement the described functions for each specific application, but such implementation should not be considered as exceeding the scope of the present disclosure.

Those skilled in the art can clearly understand that to describe conveniently and concisely, for a specific working process of the system, apparatus, and unit described above, refer to the corresponding process in the foregoing method embodiments. Details are not described herein again.

In the embodiments provided by the present disclosure, it should be understood that the disclosed apparatuses and methods may be implemented in other ways. For example, the apparatus embodiments described above are only an example. For example, the division of the units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on multiple network units. Some or all of the units may be selected according to actual needs to achieve the objective of the solutions of the embodiments.

It can be understood that those embodiments described in the embodiments of the present disclosure can be implemented by hardware, software, firmware, middleware, microcode, or a combination thereof. For implementation with hardware, the processing unit can be implemented in one or more application specific integrated circuits (ASIC), a digital signal processor (DSP), a digital signal processing device (DSP Device, DSPD), a programmable logic device (PLD), a field-programmable gate array (PFGA), a general processor, a controller, a micro-controller, a microprocessor, another electronic unit for implementing the functions of the present disclosure, or their combinations.

For implementation by software, technologies described in the embodiments of the present disclosure may be implemented by executing functional modules (for example, a process and a function) in the embodiments of the present disclosure. Software codes can be stored in the memory and executed by the processor. The memory can be implemented inside or outside the processor.

If the function is implemented in the form of software function units and sold or used as independent products, the function may be stored in a computer-readable storage medium. Based on this understanding, the essence of the technical solutions of the present disclosure, or the part contributing to the prior art, or some of the technical solutions may be represented in the form of software products. The computer software products are stored in a storage medium, and include a number of instructions to enable a computer device (which may be a personal computer, a server, a network device, or the like) to perform all or some of the steps of the methods described in various embodiments of the present disclosure. The storage medium includes various mediums, such as a USB flash disk, a removable hard disk, a ROM, a RAM, a magnetic disk, or an optical disc, that can store program code.

Those of ordinary skill in the art can understand that part or all processes of the realization of the foregoing method in the embodiments can be implemented by controlling relevant hardware by the computer program. The foregoing program may be stored on a computer-readable storage medium, where when the program is executed, the processes of the embodiments of the foregoing method can be included. The storage medium may be a magnetic disk, an optical disk, a ROM, a RAM, or the like.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A data transmission method, performed by a terminal device, and comprising:
   obtaining, by the terminal device, interface information of an external device communication protocol and a 3rd-generation partnership project 3GPP network protocol; and
   receiving or sending, by a first protocol entity of an external device communication protocol stack, data according to the interface information through a second protocol entity of an air interface protocol stack of a 3GPP network;
   wherein the data transmission method further comprises at least one of the following items (I)-(VIII):
   (I) wherein the interface information comprises at least one of the following:
   a media access control (MAC) protocol data unit (PDU) of the external device communication protocol is used as a packet data convergence protocol (PDCP) service data unit (SDU) of a first network protocol to receive or send the data;
   a data radio bearer (DRB) identifier of a first network protocol corresponding to data or a data flow of the external device communication protocol;
   an evolved packet system (EPS) bearer identifier of a first network protocol corresponding to data or a data flow of the external device communication protocol; or
   a PDCP entity identifier of a first network protocol corresponding to data or a data flow of the external device communication protocol; and
   the receiving or sending, by a first protocol entity of an external device communication protocol stack, data according to the interface information through a second protocol entity of an air interface protocol stack of a 3GPP network comprises at least one of:
   sending, by a MAC layer entity of the external device communication protocol stack, a MAC PDU to a PDCP layer entity of a first network protocol stack; or,
   receiving, by a MAC layer entity of the external device communication protocol stack, a PDCP SDU sent by a PDCP layer entity of a first network protocol stack;
   (II) wherein the interface information comprises at least one of the following:
   a MAC PDU of the external device communication protocol is used as a service data adaptation protocol (SDAP) SDU of a second network protocol to receive or send the data;
   a DRB identifier of a second network protocol corresponding to data or a data flow of the external device communication protocol;
   a PDU session identifier of a second network protocol corresponding to data or a data flow of the external device communication protocol;
   a quality of service (QoS) flow identifier of a second network protocol corresponding to data or a data flow of the external device communication protocol; or
   an SDAP entity identifier of a second network protocol corresponding to data or a data flow of the external device communication protocol; and
   the receiving or sending, by a first protocol entity of an external device communication protocol stack, data according to the interface information through a second protocol entity of an air interface protocol stack of a 3GPP network comprises at least one of:
   sending, by a MAC layer entity of the external device communication protocol stack, a MAC PDU to an SDAP layer entity of a second network protocol stack; or,
   receiving, by a MAC layer entity of the external device communication protocol stack, an SDAP SDU sent by an SDAP layer entity of a second network protocol stack;
   (III) wherein the interface information comprises at least one of the following:
   a physical layer (PHY) SDU of the external device communication protocol is used as a PDCP SDU of a first network protocol to receive or send the data;
   a DRB identifier of a first network protocol corresponding to data or a data flow of the external device communication protocol;
   an EPS bearer identifier of a first network protocol corresponding to data or a data flow of the external device communication protocol; or
   a PDCP entity identifier of a first network protocol corresponding to data or a data flow of the external device communication protocol; and
   the receiving or sending, by a first protocol entity of an external device communication protocol stack, data according to the interface information through a second protocol entity of an air interface protocol stack of a 3GPP network comprises at least one of:
   sending, by a PHY layer entity of the external device communication protocol stack, a PHY SDU to a PDCP layer entity of a first network protocol stack; or,
   receiving, by a PHY layer entity of the external device communication protocol stack, a PDCP SDU sent by a PDCP layer entity of a first network protocol stack;
   (IV) wherein the interface information comprises at least one of the following:
   a PHY SDU of the external device communication protocol is used as an SDAP SDU of a second network protocol to receive or send the data;
   a DRB identifier of a second network protocol corresponding to data or a data flow of the external device communication protocol;
   a PDU session identifier of a second network protocol corresponding to data or a data flow of the external device communication protocol;
   a QoS flow identifier of a second network protocol corresponding to data or a data flow of the external device communication protocol; or
   an SDAP entity identifier of a second network protocol corresponding to data or a data flow of the external device communication protocol; and
   the receiving or sending, by a first protocol entity of an external device communication protocol stack, data according to the interface information through a second protocol entity of an air interface protocol stack of a 3GPP network comprises at least one of:
sending, by a PHY layer entity of the external device communication protocol stack, a PHY SDU to an SDAP layer entity of a second network protocol stack; or,
receiving, by a PHY layer entity of the external device communication protocol stack, an SDAP SDU sent by an SDAP layer entity of a second network protocol stack;
(V) wherein the interface information comprises at least one of the following:
an internet protocol (IP) PDU of the external device communication protocol is used as a PDCP SDU of a first network protocol to receive or send the data;
a DRB identifier of a first network protocol corresponding to data or a data flow of the external device communication protocol;
an EPS bearer identifier of a first network protocol corresponding to data or a data flow of the external device communication protocol; or
a PDCP entity identifier of a first network protocol corresponding to data or a data flow of the external device communication protocol; and
the receiving or sending, by a first protocol entity of an external device communication protocol stack, data according to the interface information through a second protocol entity of an air interface protocol stack of a 3GPP network comprises at least one of:
sending, by an IP layer entity of the external device communication protocol stack, an IP PDU to a PDCP layer entity of a first network protocol stack; or,
receiving, by an IP layer entity of the external device communication protocol stack, a PDCP SDU sent by a PDCP layer entity of a first network protocol stack;
(VI) wherein the interface information comprises at least one of the following:
an IP PDU of the external device communication protocol is used as an SDAP SDU of a second network protocol to receive or send the data;
a DRB identifier of a second network protocol corresponding to data or a data flow of the external device communication protocol;
a PDU session identifier of a second network protocol corresponding to data or a data flow of the external device communication protocol;
a QoS flow identifier of a second network protocol corresponding to data or a data flow of the external device communication protocol; or
an SDAP entity identifier of a second network protocol corresponding to data or a data flow of the external device communication protocol; and
the receiving or sending, by a first protocol entity of an external device communication protocol stack, data according to the interface information through a second protocol entity of an air interface protocol stack of a 3GPP network comprises at least one of:
sending, by an IP layer entity of the external device communication protocol stack, an IP PDU to an SDAP layer entity of a second network protocol stack; or,
receiving, by an IP layer entity of the external device communication protocol stack, an SDAP SDU sent by an SDAP layer entity of a second network protocol stack;
(VII) wherein the interface information comprises at least one of the following:
a robust header compression (ROHC) SDU of the external device communication protocol is used as a PDCP SDU of a first network protocol to receive or send the data;
a DRB identifier of a first network protocol corresponding to data or a data flow of the external device communication protocol;
an EPS bearer identifier of a first network protocol corresponding to data or a data flow of the external device communication protocol; or
a PDCP entity identifier of a first network protocol corresponding to data or a data flow of the external device communication protocol; and
the receiving or sending, by a first protocol entity of an external device communication protocol stack, data according to the interface information through a second protocol entity of an air interface protocol stack of a 3GPP network comprises at least one of:
sending, by an ROHC layer entity of the external device communication protocol stack, an ROHC SDU to a PDCP layer entity of a first network protocol stack; or,
receiving, by an ROHC layer entity of the external device communication protocol stack, a PDCP SDU sent by a PDCP layer entity of a first network protocol stack;
(VIII) wherein the interface information comprises at least one of the following:
an ROHC SDU of the external device communication protocol is used as an SDAP SDU of a second network protocol to receive or send the data;
a DRB identifier of a second network protocol corresponding to data or a data flow of the external device communication protocol;
a PDU session identifier of a second network protocol corresponding to data or a data flow of the external device communication protocol;
a QoS flow identifier of a second network protocol corresponding to data or a data flow of the external device communication protocol; or
an SDAP entity identifier of a second network protocol corresponding to data or a data flow of the external device communication protocol; and
the receiving or sending, by a first protocol entity of an external device communication protocol stack, data according to the interface information through a second protocol entity of an air interface protocol stack of a 3GPP network comprises at least one of:
sending, by an ROHC layer entity of the external device communication protocol stack, an ROHC SDU to an SDAP layer entity of a second network protocol stack; or,
receiving, by an ROHC layer entity of the external device communication protocol stack, an SDAP SDU sent by an SDAP layer entity of a second network protocol stack.

2. The method according to claim 1, wherein the external device communication protocol comprises any one of the following:
a wireless fidelity WiFi communication protocol;
a bluetooth protocol; or
a wired local area network communication protocol.

3. A terminal device, comprising a memory, a processor, and a computer program stored in the memory and capable of running on the processor, wherein the computer program is executed by the processor to perform steps of:
obtaining interface information of an external device communication protocol and a 3rd-generation partnership project 3GPP network protocol; and receiving or sending, by a first protocol entity of an external device communication protocol stack, data according to the interface information through a second protocol entity of an air interface protocol stack of a 3GPP network;

wherein the computer program is executed by the processor to perform at least one of the following items (I)-(VIII):

(I) wherein the interface information comprises at least one of the following:
a media access control (MAC) protocol data unit (PDU) of the external device communication protocol is used as a packet data convergence protocol (PDCP) service data unit (SDU) of a first network protocol to receive or send the data;
a data radio bearer (DRB) identifier of a first network protocol corresponding to data or a data flow of the external device communication protocol;
an evolved packet system (EPS) bearer identifier of a first network protocol corresponding to data or a data flow of the external device communication protocol; or
a PDCP entity identifier of a first network protocol corresponding to data or a data flow of the external device communication protocol; and
the receiving or sending, by a first protocol entity of an external device communication protocol stack, data according to the interface information through a second protocol entity of an air interface protocol stack of a 3GPP network comprises at least one of:
sending, by a MAC layer entity of the external device communication protocol stack, a MAC PDU to a PDCP layer entity of a first network protocol stack; or,
receiving, by a MAC layer entity of the external device communication protocol stack, a PDCP SDU sent by a PDCP layer entity of a first network protocol stack;

(II) wherein the interface information comprises at least one of the following:
a MAC PDU of the external device communication protocol is used as a service data adaptation protocol (SDAP) SDU of a second network protocol to receive or send the data;
a DRB identifier of a second network protocol corresponding to data or a data flow of the external device communication protocol;
a PDU session identifier of a second network protocol corresponding to data or a data flow of the external device communication protocol;
a quality of service (QoS) flow identifier of a second network protocol corresponding to data or a data flow of the external device communication protocol; or
an SDAP entity identifier of a second network protocol corresponding to data or a data flow of the external device communication protocol; and
the receiving or sending, by a first protocol entity of an external device communication protocol stack, data according to the interface information through a second protocol entity of an air interface protocol stack of a 3GPP network comprises at least one of:
sending, by a MAC layer entity of the external device communication protocol stack, a MAC PDU to an SDAP layer entity of a second network protocol stack; or,
receiving, by a MAC layer entity of the external device communication protocol stack, an SDAP SDU sent by an SDAP layer entity of a second network protocol stack;

(III) wherein the interface information comprises at least one of the following:
a physical layer (PHY) SDU of the external device communication protocol is used as a PDCP SDU of a first network protocol to receive or send the data;
a DRB identifier of a first network protocol corresponding to data or a data flow of the external device communication protocol;
an EPS bearer identifier of a first network protocol corresponding to data or a data flow of the external device communication protocol; or
a PDCP entity identifier of a first network protocol corresponding to data or a data flow of the external device communication protocol; and
the receiving or sending, by a first protocol entity of an external device communication protocol stack, data according to the interface information through a second protocol entity of an air interface protocol stack of a 3GPP network comprises at least one of:
sending, by a PHY layer entity of the external device communication protocol stack, a PHY SDU to a PDCP layer entity of a first network protocol stack; or,
receiving, by a PHY layer entity of the external device communication protocol stack, a PDCP SDU sent by a PDCP layer entity of a first network protocol stack;

(IV) wherein the interface information comprises at least one of the following:
a PHY SDU of the external device communication protocol is used as an SDAP SDU of a second network protocol to receive or send the data;
a DRB identifier of a second network protocol corresponding to data or a data flow of the external device communication protocol;
a PDU session identifier of a second network protocol corresponding to data or a data flow of the external device communication protocol;
a QoS flow identifier of a second network protocol corresponding to data or a data flow of the external device communication protocol; or
an SDAP entity identifier of a second network protocol corresponding to data or a data flow of the external device communication protocol; and
the receiving or sending, by a first protocol entity of an external device communication protocol stack, data according to the interface information through a second protocol entity of an air interface protocol stack of a 3GPP network comprises at least one of:
sending, by a PHY layer entity of the external device communication protocol stack, a PHY SDU to an SDAP layer entity of a second network protocol stack; or,
receiving, by a PHY layer entity of the external device communication protocol stack, an SDAP SDU sent by an SDAP layer entity of a second network protocol stack;

(V) wherein the interface information comprises at least one of the following:
an internet protocol (IP) PDU of the external device communication protocol is used as a PDCP SDU of a first network protocol to receive or send the data;
a DRB identifier of a first network protocol corresponding to data or a data flow of the external device communication protocol;
an EPS bearer identifier of a first network protocol corresponding to data or a data flow of the external device communication protocol; or a PDCP entity identifier of a first network protocol corresponding to data or a data flow of the external device communication protocol; and the receiving or sending, by a first protocol entity of an external device communication protocol stack, data according to the interface information through a second protocol entity of an air interface protocol stack of a 3GPP network comprises at least one of:

sending, by an IP layer entity of the external device communication protocol stack, an IP PDU to a PDCP layer entity of a first network protocol stack; or, receiving, by an IP layer entity of the external device communication protocol stack, a PDCP SDU sent by a PDCP layer entity of a first network protocol stack;

(VI) wherein the interface information comprises at least one of the following:

an IP PDU of the external device communication protocol is used as an SDAP SDU of a second network protocol to receive or send the data;

a DRB identifier of a second network protocol corresponding to data or a data flow of the external device communication protocol;

a PDU session identifier of a second network protocol corresponding to data or a data flow of the external device communication protocol;

a QoS flow identifier of a second network protocol corresponding to data or a data flow of the external device communication protocol; or an SDAP entity identifier of a second network protocol corresponding to data or a data flow of the external device communication protocol; and the receiving or sending, by a first protocol entity of an external device communication protocol stack, data according to the interface information through a second protocol entity of an air interface protocol stack of a 3GPP network comprises at least one of:

sending, by an IP layer entity of the external device communication protocol stack, an IP PDU to an SDAP layer entity of a second network protocol stack; or, receiving, by an IP layer entity of the external device communication protocol stack, an SDAP SDU sent by an SDAP layer entity of a second network protocol stack;

(VII) wherein the interface information comprises at least one of the following:

a robust header compression (ROHC) SDU of the external device communication protocol is used as a PDCP SDU of a first network protocol to receive or send the data;

a DRB identifier of a first network protocol corresponding to data or a data flow of the external device communication protocol;

an EPS bearer identifier of a first network protocol corresponding to data or a data flow of the external device communication protocol; or a PDCP entity identifier of a first network protocol corresponding to data or a data flow of the external device communication protocol; and the receiving or sending, by a first protocol entity of an external device communication protocol stack, data according to the interface information through a second protocol entity of an air interface protocol stack of a 3GPP network comprises at least one of:

sending, by an ROHC layer entity of the external device communication protocol stack, an ROHC SDU to a PDCP layer entity of a first network protocol stack; or, receiving, by an ROHC layer entity of the external device communication protocol stack, a PDCP SDU sent by a PDCP layer entity of a first network protocol stack;

(VIII) wherein the interface information comprises at least one of the following:

an ROHC SDU of the external device communication protocol is used as an SDAP SDU of a second network protocol to receive or send the data;

a DRB identifier of a second network protocol corresponding to data or a data flow of the external device communication protocol;

a PDU session identifier of a second network protocol corresponding to data or a data flow of the external device communication protocol;

a QoS flow identifier of a second network protocol corresponding to data or a data flow of the external device communication protocol; or an SDAP entity identifier of a second network protocol corresponding to data or a data flow of the external device communication protocol; and the receiving or sending, by a first protocol entity of an external device communication protocol stack, data according to the interface information through a second protocol entity of an air interface protocol stack of a 3GPP network comprises at least one of:

sending, by an ROHC layer entity of the external device communication protocol stack, an ROHC SDU to an SDAP layer entity of a second network protocol stack; or, receiving, by an ROHC layer entity of the external device communication protocol stack, an SDAP SDU sent by an SDAP layer entity of a second network protocol stack.

4. The terminal device according to claim 3, wherein the external device communication protocol comprises any one of the following:
   a wireless fidelity WiFi communication protocol;
   a bluetooth protocol; or
   a wired local area network communication protocol.

5. A computer-readable storage medium, storing a computer program, wherein the computer program is executed by a processor to perform steps of:

obtaining interface information of an external device communication protocol and a 3rd-generation partnership project 3GPP network protocol; and receiving or sending, by a first protocol entity of an external device communication protocol stack, data according to the interface information through a second protocol entity of an air interface protocol stack of a 3GPP network;

wherein the computer program is executed by the processor to perform at least one of the following items (I)-(VIII):

(I) wherein the interface information comprises at least one of the following:

a media access control (MAC) protocol data unit (PDU) of the external device communication protocol is used as a packet data convergence protocol (PDCP) service data unit (SDU) of a first network protocol to receive or send the data;

a data radio bearer (DRB) identifier of a first network protocol corresponding to data or a data flow of the external device communication protocol;

an evolved packet system (EPS) bearer identifier of a first network protocol corresponding to data or a data flow of the external device communication protocol; or a PDCP entity identifier of a first network protocol corresponding to data or a data flow of the external device communication protocol; and
the receiving or sending, by a first protocol entity of an external device communication protocol stack, data according to the interface information through a second protocol entity of an air interface protocol stack of a 3GPP network comprises at least one of:
sending, by a MAC layer entity of the external device communication protocol stack, a MAC PDU to a PDCP layer entity of a first network protocol stack; or,
receiving, by a MAC layer entity of the external device communication protocol stack, a PDCP SDU sent by a PDCP layer entity of a first network protocol stack;
(II) wherein the interface information comprises at least one of the following:
a MAC PDU of the external device communication protocol is used as a service data adaptation protocol (SDAP) SDU of a second network protocol to receive or send the data;
a DRB identifier of a second network protocol corresponding to data or a data flow of the external device communication protocol;
a PDU session identifier of a second network protocol corresponding to data or a data flow of the external device communication protocol;
a quality of service (QoS) flow identifier of a second network protocol corresponding to data or a data flow of the external device communication protocol; or
an SDAP entity identifier of a second network protocol corresponding to data or a data flow of the external device communication protocol; and
the receiving or sending, by a first protocol entity of an external device communication protocol stack, data according to the interface information through a second protocol entity of an air interface protocol stack of a 3GPP network comprises at least one of:
sending, by a MAC layer entity of the external device communication protocol stack, a MAC PDU to an SDAP layer entity of a second network protocol stack; or,
receiving, by a MAC layer entity of the external device communication protocol stack, an SDAP SDU sent by an SDAP layer entity of a second network protocol stack;
(III) wherein the interface information comprises at least one of the following:
a physical layer (PHY) SDU of the external device communication protocol is used as a PDCP SDU of a first network protocol to receive or send the data;
a DRB identifier of a first network protocol corresponding to data or a data flow of the external device communication protocol;
an EPS bearer identifier of a first network protocol corresponding to data or a data flow of the external device communication protocol; or
a PDCP entity identifier of a first network protocol corresponding to data or a data flow of the external device communication protocol; and
the receiving or sending, by a first protocol entity of an external device communication protocol stack, data according to the interface information through a second protocol entity of an air interface protocol stack of a 3GPP network comprises at least one of:
sending, by a PHY layer entity of the external device communication protocol stack, a PHY SDU to a PDCP layer entity of a first network protocol stack; or,
receiving, by a PHY layer entity of the external device communication protocol stack, a PDCP SDU sent by a PDCP layer entity of a first network protocol stack;
(IV) wherein the interface information comprises at least one of the following:
a PHY SDU of the external device communication protocol is used as an SDAP SDU of a second network protocol to receive or send the data;
a DRB identifier of a second network protocol corresponding to data or a data flow of the external device communication protocol;
a PDU session identifier of a second network protocol corresponding to data or a data flow of the external device communication protocol;
a QoS flow identifier of a second network protocol corresponding to data or a data flow of the external device communication protocol; or
an SDAP entity identifier of a second network protocol corresponding to data or a data flow of the external device communication protocol; and
the receiving or sending, by a first protocol entity of an external device communication protocol stack, data according to the interface information through a second protocol entity of an air interface protocol stack of a 3GPP network comprises at least one of:
sending, by a PHY layer entity of the external device communication protocol stack, a PHY SDU to an SDAP layer entity of a second network protocol stack; or,
receiving, by a PHY layer entity of the external device communication protocol stack, an SDAP SDU sent by an SDAP layer entity of a second network protocol stack;
(V) wherein the interface information comprises at least one of the following:
an internet protocol (IP) PDU of the external device communication protocol is used as a PDCP SDU of a first network protocol to receive or send the data;
a DRB identifier of a first network protocol corresponding to data or a data flow of the external device communication protocol;
an EPS bearer identifier of a first network protocol corresponding to data or a data flow of the external device communication protocol; or
a PDCP entity identifier of a first network protocol corresponding to data or a data flow of the external device communication protocol; and
the receiving or sending, by a first protocol entity of an external device communication protocol stack, data according to the interface information through a second protocol entity of an air interface protocol stack of a 3GPP network comprises at least one of:
sending, by an IP layer entity of the external device communication protocol stack, an IP PDU to a PDCP layer entity of a first network protocol stack; or,
receiving, by an IP layer entity of the external device communication protocol stack, a PDCP SDU sent by a PDCP layer entity of a first network protocol stack;
(VI) wherein the interface information comprises at least one of the following:
an IP PDU of the external device communication protocol is used as an SDAP SDU of a second network protocol to receive or send the data;
a DRB identifier of a second network protocol corresponding to data or a data flow of the external device communication protocol;

a PDU session identifier of a second network protocol corresponding to data or a data flow of the external device communication protocol;

a QoS flow identifier of a second network protocol corresponding to data or a data flow of the external device communication protocol; or an SDAP entity identifier of a second network protocol corresponding to data or a data flow of the external device communication protocol; and the receiving or sending, by a first protocol entity of an external device communication protocol stack, data according to the interface information through a second protocol entity of an air interface protocol stack of a 3GPP network comprises at least one of:

sending, by an IP layer entity of the external device communication protocol stack, an IP PDU to an SDAP layer entity of a second network protocol stack; or, receiving, by an IP layer entity of the external device communication protocol stack, an SDAP SDU sent by an SDAP layer entity of a second network protocol stack;

(VII) wherein the interface information comprises at least one of the following:

a robust header compression (ROHC) SDU of the external device communication protocol is used as a PDCP SDU of a first network protocol to receive or send the data;

a DRB identifier of a first network protocol corresponding to data or a data flow of the external device communication protocol;

an EPS bearer identifier of a first network protocol corresponding to data or a data flow of the external device communication protocol; or a PDCP entity identifier of a first network protocol corresponding to data or a data flow of the external device communication protocol; and the receiving or sending, by a first protocol entity of an external device communication protocol stack, data according to the interface information through a second protocol entity of an air interface protocol stack of a 3GPP network comprises at least one of:

sending, by an ROHC layer entity of the external device communication protocol stack, an ROHC SDU to a PDCP layer entity of a first network protocol stack; or, receiving, by an ROHC layer entity of the external device communication protocol stack, a PDCP SDU sent by a PDCP layer entity of a first network protocol stack;

(VIII) wherein the interface information comprises at least one of the following:

an ROHC SDU of the external device communication protocol is used as an SDAP SDU of a second network protocol to receive or send the data;

a DRB identifier of a second network protocol corresponding to data or a data flow of the external device communication protocol;

a PDU session identifier of a second network protocol corresponding to data or a data flow of the external device communication protocol;

a QoS flow identifier of a second network protocol corresponding to data or a data flow of the external device communication protocol; or an SDAP entity identifier of a second network protocol corresponding to data or a data flow of the external device communication protocol; and the receiving or sending, by a first protocol entity of an external device communication protocol stack, data according to the interface information through a second protocol entity of an air interface protocol stack of a 3GPP network comprises at least one of:

sending, by an ROHC layer entity of the external device communication protocol stack, an ROHC SDU to an SDAP layer entity of a second network protocol stack; or, receiving, by an ROHC layer entity of the external device communication protocol stack, an SDAP SDU sent by an SDAP layer entity of a second network protocol stack.

6. The computer-readable storage medium according to claim 5, wherein the external device communication protocol comprises any one of the following:

a wireless fidelity WiFi communication protocol;

a bluetooth protocol; or a wired local area network communication protocol.

* * * * *